Patented July 10, 1951

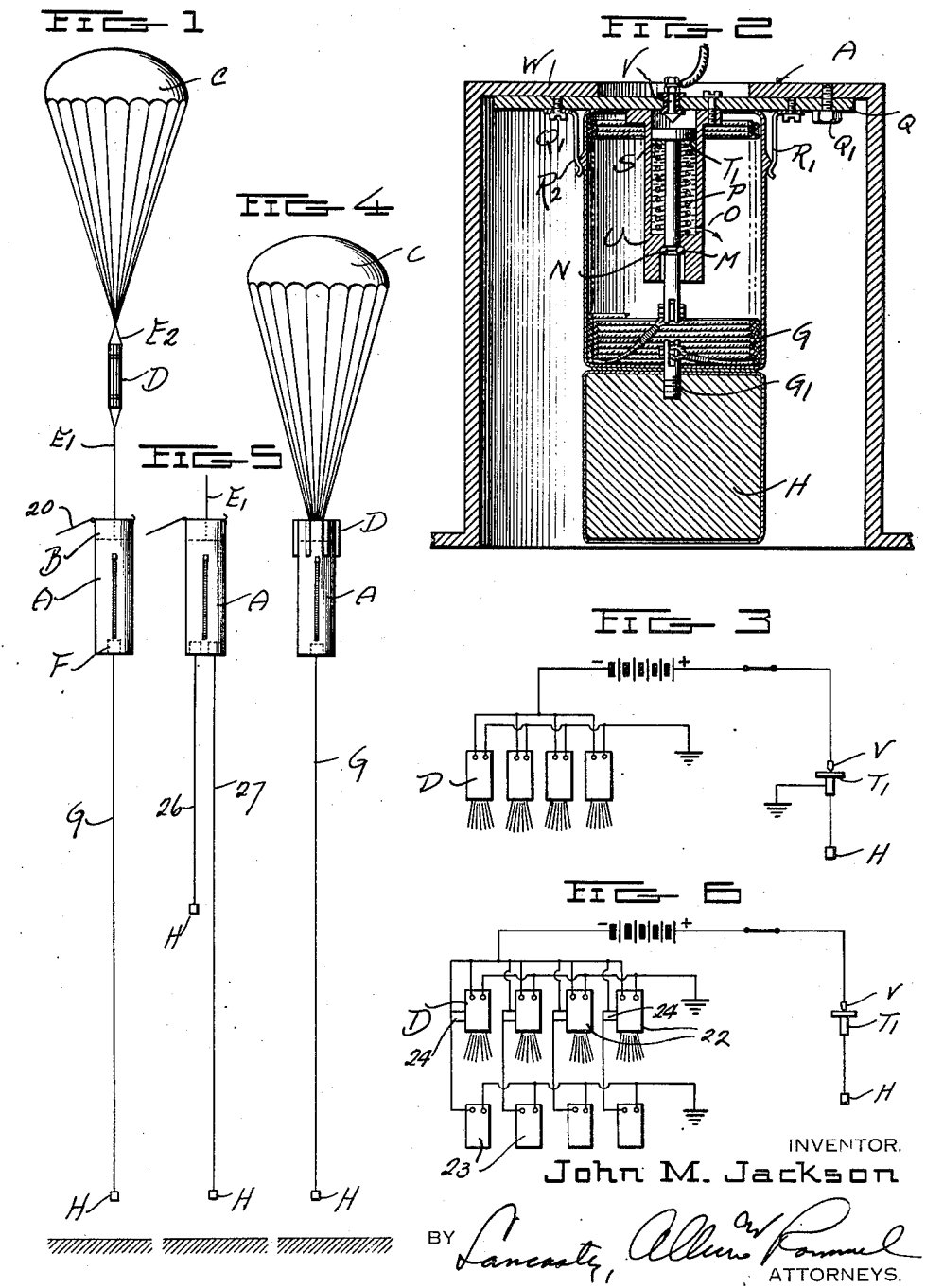

2,560,445

UNITED STATES PATENT OFFICE 2,560,445

SAFETY LOWERING DEVICE, INCLUDING ROCKET DECELERATOR

John Maxwell Jackson, East Finchley, London, England, assignor to Irving Air Chute Co., Inc., Buffalo, N. Y., a corporation Application July 22, 1947, Serial No. 762,756
In Great Britain August 1, 1941

Section 1, Public Law 690, August 8, 1946
Patent expires August 1, 1961

10 Claims. (Cl. 244—138)

This invention relates to methods of and apparatus for landing objects from the air by means of parachutes.

In order to land an object from the air it has hitherto been proposed to launch the object under control of a relatively small parachute of which the retarding effect is small enough to permit the object to descend at a relatively high speed, and then to reduce the speed to a safe landing value by providing means operative at a predetermined height above the landing place to release a larger parachute, also attached to the object, which larger parachute exerts a retarding force sufficient to reduce the speed to the required safe value.

Apparatus according to the invention for landing an object from the air comprises in combination, a parachute of a size small in relation to the load to be supported thereby, whereby the descent of the falling mass is relatively rapid, normally inactive means for generating a stream of fluid, said generating means being attached to the falling mass so as to direct the stream downwardly and thereby produce a force tending to lift said mass, and means for bringing said generating means into operation when the mass reaches a predetermined height above the landing place, whereby the landing speed of the mass is reduced to a safe value.

It will be seen that whereas apparatus according to the invention includes a means for generating a stream of fluid directed downwardly so as to exert a lifting force on the mass to decelerate it, the apparatus previously proposed is entirely inert and does not produce any lifting force at all, the retardation being due solely to the reaction of the air against the pull of gravity.

In a preferred embodiment of the invention the means for generating the stream of fluid comprises one or more rockets so attached to the falling mass that the gas generated by combustion of the rockets is directed downwardly and therefore exerts a lifting force on the falling mass, and the apparatus also includes means for igniting the rocket or rockets when the mass reaches a predetermined height above the landing place.

For example, there may be provided a firing pin for igniting the rocket or rockets, the said pin being normally maintained inoperative by a detent, and means sensitive to a predetermined height above the landing place to withdraw the detent and permit operation of the pin to ignite the rockets.

The means for bringing the force-producing means into action may include a wire suspended from the falling mass and having a length corresponding to the height above the landing place at which activation of the force-producing means is desired, and an electrical contact adapted to close on contact of said wire with the landing place.

From the foregoing it will be seen that the invention involves a novel principle of control of apparatus for landing an object by parachute from the air consisting in utilizing a parachute of which the retarding effect is small in relation to the load which it is carrying so that the falling mass descends relatively rapidly, generating a downwardly directed stream of fluid, and applying to the mass the lifting force produced by said stream, when the mass reaches a predetermined height above the landing place, whereby the speed of descent is reduced to a safe value before impact with the landing place occurs.

Two embodiments of the invention will now be described by way of example with reference to the accompanying diagrammatic drawings, which show forms of apparatus according to the invention including an advanced contact wire for bringing the force-producing means into action.

Other objects and advantages of the invention will be apparent during the following detailed description of the invention, taken in connection with the accompanying drawings, and in which drawings:

Figure 1 illustrates one form of parachute apparatus, showing the parts as they would appear during descent.

Figure 2 illustrates an arrangement of parts for closing an electric rocket firing circuit.

Figure 3 shows diagrammatically a wiring circuit for the firing of a group of rockets.

Figure 4 illustrates a modified form of parachute apparatus, with a different arrangement of rockets.

Figure 5 is a further modified form of parachute apparatus, showing a multiple control arrangement for a plurality of rocket controlling ignition circuits.

Figure 6 shows diagrammatically a wiring circuit for the control of different groups of rockets, wherein after the firing of one group a second group will be put into action, to decelerate parachute load descent.

In the embodiment of the invention illustrated in Figure 1 of the drawings, the apparatus comprises a container A for the equipment or other articles to be landed, which container has at its upper end a stowage space B for the relatively small parachute C and for a plurality of decelerating rockets shown diagrammatically at D, these rockets being so attached to the parachute and to the container that when the parachute opens out during descent the rockets are immediately below it and the container is below the rockets, the latter being attached by a cable E1 to the container and by cables E2 to the parachute.

In the bottom of the container A is provided stowage space indicated at F for an advanced contact wire G having a sinker or weight H attached to its free end, the other end of the said wire being attached to the container.

Known means is provided for releasing the parachute C from the container A after the latter has been launched from the aircraft, but since this releasing means forms no part of the present invention it is not shown in the drawing except for a closure 20. When the parachute opens and thereby decelerates the falling container the weighted wire G will leave the container A and become extended, the weight H serving to maintain the wire taut and approximately vertical.

Alternatively, the rockets, instead of being located between the container and the parachute as shown in Figure 1, may be attached directly to the outside of the container, as shown in Figure 4, in which case the container will be directly suspended from the parachute.

When the weight H strikes the ground or other landing place the wire G serves to close a contact which completes an electric circuit through a battery serving to operate a device for igniting the rockets.

One means for thus completing the circuit is shown diagrammatically in Figure 3, in which the wire G is shown coiled within a casing L attached to the underside of the container A by means of spring clips R1, R2, engaging a circumferential bead formed on the casing.

The weight H is permanently secured to the bottom of the casing L, within which the wire G is wound in two layers, the end turn of the outer layer being secured to a shackle G1 screwed into the centre of the weight and projecting into the interior of the casing L, while the end turn of the inner layer is secured to a plunger T constituting a firing pin for the rockets.

The spring clips R1, R2, are carried by a base plate Q which is fastened to the bottom W of the container A by means of screws Q1 and carries an insulated contact V and a metal cylinder U connected to the plate Q by screws U1 of which one only appears in Figure 3. The cylinder U is recessed at its lower end to form a housing for retaining balls M which cooperate with a groove N cut in the plunger or firing pin T so as to constitute a detent which normally holds the head T1 of the plunger away from the contact V against the action of a spring P.

The spring chamber within the cylinder U is filled with thick grease which must be extruded through the hole O before the balls M can be released, the joint at the head of the plunger being rendered grease-tight by means of a washer S.

In operation the drag of the support parachute C causes the casing L to be thrown clear of the clips R1, R2 and the coils of wire G then unwinds. The wire eventually pulls tight, drawing the plunger T downwards and compressing the spring P. The grease contained in the cylinder U is extruded through the hole O thus absorbing the shocks set up when the wire pulls tight. (If the shock were not absorbed the bounce back of the plunger due to the elasticity of the wire would cause premature firing of the rockets.)

The weight is sufficient to pull the plunger T downwards against the action of the spring P until the groove N is below the bottom of the cylinder U whereupon the balls M drop out. This action occurs before the weight H strikes the landing place, its timing being dependent upon the size of the hole O and the nature of the grease employed.

When the weight H strikes the landing place the spring P is relieved of the load due to the weight and forces the plunger T upwardly. Since the balls M have escaped the plunger is free to move up until its head T1 engages the contact V thereby completing the rocket firing circuit. This circuit shown in Figure 3 may include a normally open safety switch 21, which is closed before the apparatus is launched from the aircraft.

The rockets D are disposed so as to direct the gases of combustion downwardly whereby a lifting force is produced and applied to the falling mass so as to decelerate its descent.

The magnitude of the deceleration depends, of course, on the lifting force exerted by the rockets and the final velocity will depend upon the time during which this deceleration is operative, i. e. upon the length of the advanced contact wire G. Accordingly the lifting force exerted by the rockets and the length of the advanced contact wire are selected in relation to one another and to the dimensions of the parachute and the weight of the falling mass, so as to give to the latter the desired safe velocity at the moment of impact with the ground or other landing place.

According to another feature of the invention, in order to increase the deceleration time a plurality of groups of rockets, shown at 22 and 23 in Figure 6, may be provided and the igniting means may act so as to fire one group 22 as above mentioned and later another group 23 through the normally open thermostatically or fuse-controlled switches 24 as the first group ceases to burn. By providing groups of rockets instead of a single rocket or a series of single rockets each burning separately, the device is rendered more reliable because the failure of one small rocket in a group would not constitute a failure of the whole apparatus.

As an additional safeguard two contact wires 26 and 27 might be provided, each serving to operate a separate circuit. In such case the wires could be of the same or different lengths, as shown in Figure 5 of the drawing.

Apparatus embodying the novel principle according to the invention has the advantage that it dispenses entirely with the large retarding parachute hitherto proposed for the purpose of decelerating the falling mass, thereby saving considerable quantities of the material from which such parachutes are made.

For military use, since the objects which are attached to apparatus according to the invention frequently have to be landed in close proximity to the enemy it is generally impossible to recover the parachute, the invention obviates the employment of valuable and scarce parachute material which, if used, can only be used once, and is thereafter completely lost.

In addition apparatus according to the invention, while effecting this saving in parachute material, still possesses the advantages of the prior proposals in which the large retarding parachutes are employed, namely that since the mass is descending at a relatively high velocity during the greater part of its descent, the retarding effect of the small parachute forming part thereof is greater in proportion to its size than it would be in the case of a relatively large, lightly loaded, parachute descending at a relatively low velocity, and further that the stresses to which the parachutes and connections are subjected at the time of dropping from the aircraft are greatly reduced, since with the invention the descent speed can be relatively high, say of the order of 100 feet per second, although the actual landing velocity, of course, will be greatly below this figure due to the retarding effect of the device according to the invention.

Moreover the rapid descent minimizes wind drift and therefore facilitates accurate dropping of equipment or other articles. It would also render more difficult the task of locating and destroying the equipment during its descent to the ground.

Although in the foregoing example an apparatus including an advanced contact wire G for firing the rockets has been described, the invention also includes other means for achieving this purpose, e. g. a time fuse presettable before the apparatus is launched from the aircraft, atmospheric pressure devices, sound wave reflection devices, reflected wireless wave devices, or electrical devices utilizing earth capacity effect.

Various changes may be made to the form of the invention herein shown and described without departing from the spirit of the invention or scope of the claims.

I claim:

1. Apparatus for landing an object from the air comprising in combination a parachute of a size small in relation to the load supported thereby so that the descent of the falling load as supported thereby would normally be such as not to prevent injury to the load upon impact with the earth, normally inactive means for generating a stream of fluid, said generating means being attached to the falling load so as to direct the stream downwardly and thereby produce a force tending to lift said load, and means for bringing said generating means in operation when the load reaches a predetermined height above the landing place, whereby the landing speed of the load will be reduced to a safe value.

2. Apparatus according to claim 1 wherein the means for generating the stream of fluid comprises rocket means directly attached to the falling load so as to exert a lifting force while burning, the apparatus also including means for igniting the rcket means when the load reaches a predetermined height above the landing place.

3. Apparatus for decelerating the landing of a parachute load comprising a load, a releasably housed parachute attached to the load, rocket means operatively connected with the load and in position therewith to exert a downward firing action for deceleration of the load, and means to fire the rocket means at a predetermined height above a landing location.

4. In a parachute construction the combination of a container, a releasable parachute carried by the container, a rocket operatively associated with the parachute and the container arranged to fire downwardly, an electrical firing circuit for the rocket including a normally open switch, and control means associated with the normally opened switch to close the same and fire the rocket at a predetermined elevation above a landing location.

5. In a parachute construction for decelerating the rate of descent of a load the combination of a container having a parachute operatively connected therewith, rocket means operatively associated with the container in position to fire downwardly, a weight releasably associated with the container having a cable connected therewith, an ignition circuit for the rocket including a normally opened switch, a detent to normally hold the switch open, said cable having connection with said detent for effecting the release thereof and the closing of the switch when the weight hits a landing location.

6. In apparatus for landing a load from aircraft the combination with a load, aerial position stabilizing means connected with the load, a speed decelerating rocket connected with the load and in position to face directly downwardly when the position stabilizing means is in operative position during the dropping of a load, and means for firing the rocket at a predetermined distance above a landing place.

7. In apparatus for landing a load from aircraft the combination with a load, aerial position stabilizing means connected with the load, a plurality of speed decelerating rockets connected with the load and in position to face directly downwardly for firing when the position stabilizing means is in operative position during dropping of the load, and means for firing the rockets successively at different but predetermined distances above a landing place.

8. In apparatus for landing a load from aircraft the combination with a load of aerial position stabilizing means connected with the load, a plurality of speed decelerating rockets connected with the load and in position to fire directly downwardly when the position stabilizing means supports the load during aerial dropping, means for firing one of the rockets at a predetermined distance above a landing place, and thermostatically controlled means associated with the first fired rocket for firing the second rocket after predetermined operative firing of the first mentioned rocket.

9. In apparatus for landing a load from aircraft the combination with a load, a position stabilizing parachute connected with the load, a speed decelerating rocket connected with the load and in position to face directly downwardly when the parachute is deployed during the dropping of the load, a weight having means connecting it with the load to release the same upon deployment of the parachute at the time of air impact opening thereof, cable means connected with the weight for extension in dropping of the weight upon release of the latter, rocket firing means connected with the cable remote from the weight normally inoperatively positioned and so associated and arranged as to fire the rocket when the load hits a landing location to release the support of the weight upon said cable.

10. In apparatus for landing a load from aircraft the combination with the load, of aerial position stabilizing means connected with the load, a speed decelerating rocket connected with the load and in position to face directly downwardly when the position stabilizing means is operating during dropping of the load, a weight, a cable connected with the weight, firing means for the rocket, detent means normally holding the firing means inoperative, said firing means including a firing pin connected with the cable, spring means normally urging the firing pin into position for firing the rocket upon release of the detent means, and hydraulic means to initially buff the impact shock of the weight when the cable is stretched taut for actuating said firing pin.

JOHN MAXWELL JACKSON.

REFERENCES CITED

The following references are of record in the file of this patent:

UNITED STATES PATENTS

| Number | Name | Date |
|---|---|---|
| 1,003,411 | Bales | Sept. 19, 1911 |
| 1,611,353 | Lepinte | Dec. 21, 1926 |
| 1,709,264 | Holt | Apr. 16, 1929 |
| 2,414,284 | Bacon | Jan. 14, 1947 |

FOREIGN PATENTS

| Number | Country | Date |
|---|---|---|
| 330,443 | Great Britain | June 12, 1930 |

Certificate of Correction

Patent No. 2,560,445                                                July 10, 1951

JOHN MAXWELL JACKSON

It is hereby certified that error appears in the printed specification of the above numbered patent requiring correction as follows:

Column 6, line 21, after "predetermined" insert *and definite*;

and that the said Letters Patent should be read as corrected above, so that the same may conform to the record of the case in the Patent Office.

Signed and sealed this 4th day of September, A. D. 1951.

[SEAL]

THOMAS F. MURPHY,
*Assistant Commissioner of Patents.*